Patented Apr. 14, 1942

2,279,754

UNITED STATES PATENT OFFICE 2,279,754

SURFACE COATING

William Krumbhaar, New York, N. Y.

No Drawing. Application March 29, 1940,
Serial No. 326,787

17 Claims. (Cl. 106—252)

This invention relates to improved oleo-resinous coatings and such coatings with novel surface characteristics, to components and compositions useful in the production of such coatings, and to methods of making the coatings and the components thereof.

It is generally accepted today that dried films of oleo-resinous surface coatings consist of a solid phase, which is arranged in a honey comb structure, and a liquid phase which is embedded within the solid honey comb skeleton. During the process of through drying and aging of the coating, the film exudes liquid matter from its spongy structure. The liquid is forced to the surface, spreads out in the form of a thin layer covering the surface, and thereby produces a tacky condition. As is well known, this tackiness may last for a long time after actual drying and results in many technical disadvantages in actual practice, such as delay and difficulty in the proper handling of the coated articles, collection of dirt on the surfaces, the necessity of forced drying of the compositions, and other difficulties. In addition, prior art coatings are subject to blooming, the bluish haze so often destroying the good appearance of surface coating films, and prevention of blooming is one of the big problems in varnish making.

Among the objects of the present invention is the production of surface coatings free from such difficulties of the prior art.

Other objects include the production of coatings which dry with a dense, non-porous surface, possessing a glazed and glossy appearance and a tack-free porcelain-like feel.

Other objects include the production of new components for use in the production of such surface coatings, and of methods for producing such components and coatings themselves.

Further objects and advantages will appear from the more detailed description set forth below, it being understood, however, that such more detailed description is given by way of illustration and explanation only and not by way of limitation, since various changes therein may be made by those skilled in the art without departing from the scope and spirit of the present invention.

In accordance with the present invention, surface coatings are produced which dry with a dense, non-porous surface, possessing a glazed and glossy appearance and a tack-free, porcelain-like feel by producing a surface skin with a high surface tension leaving all liquid matter under the skin, and in effect shutting any such liquid matter off and preventing it from coming to the surface. The surface tension of the surface skin of coatings produced in accordance with the present invention is so high, that other liquid oleo-resinous coatings placed on top of it, are unable to adhere and to form a coherent layer, so that they are actually repelled by the glazed surface, and in consequence of such repellent action any such other liquid oleo-resinous coating draws together into isolated isles of liquid and drops, leaving exposed areas on the first coat.

The surface tension of films improved by the methods of this invention can be increased to a point where the acting forces contract the surface skin so strongly that deep longitudinal folds are formed under the stress. Ordinarily unless textured effects are to be produced, the longitudinal folds are avoided. In addition, the characteristics of coatings produced in accordance with the present invention prevent blooming. Accordingly an important object of the invention is the production of porcelain-like, non-porous and tack-free surfaces on the oleo-resinous coating, and an essential characteristic of the surface skin is its oil-repelling property, i. e., its peculiarity of making other liquid oily or oleo-resinous materials when placed on top of it, draw together in isles or drops.

The present invention has particular importance in the production of tack-free drying oleo-resinous surface coatings, such as varnishes, enamels and paints, particularly those containing soft oils like linseed, perilla, soya, and sunflower oil, and more specifically when manufactured with the help of synthetic resins such as phenolics, maleics and phthalics. Long oil phthalic resins which have always heretofore offered difficulties due to tacky surface conditions of the dried film are particularly amenable to satisfactory use in accordance with the present invention.

Such oleo-resinous surface coatings of the character referred to above are modified in accordance with the present invention by the presence of soaps of the alkali earth metals, magnesium or manganese with unsaturated fatty acids of the oleic, linolic or linoleic type, etc., used alone or in admixture as in the fatty acid complexes of the soft oils. The components used for this purpose are markedly differentiated from the use of certain metal soaps of saturated fatty acids for reducing gloss and even flatting the surface as, for example, in the use of stearates and palmitates of aluminum commonly used as flatting agents. Further the invention is not concerned with influencing the drying times, particularly not with increasing the drying speed of paints, varnishes and enamels, and this especially applies to the manganese compounds which may be used in accordance with this invention, and the action of which is distinctly different from the customary use of manganese as a drier metal. It has thus been found that the soaps of unsaturated fatty acids, and more particularly those of calcium, magnesium and manganese have an entirely different effect on the film-formation of surface coatings to which they are added. They act in an unexpected and amazing way by producing an oil repellent, porcelain-like surface skin with the characteristics hereinabove described. Metals other than those mentioned which are used in other relations to influence surface characteristics, such as aluminum, zinc or lead do not give the effects of the soaps utilized in accordance with the present invention.

The calcium soaps are the strongest in their action, magnesium compounds being somewhat more weak, whereas manganese soaps have nearly the same effect as calcium soaps. The action of manganese as an oxidation catalyst which is apparent during the initial drying period, does not distract from its ability to produce a surface skin of high tension, but to obtain the effects desired in accordance with the present invention, the manganese soaps are used in amounts considerably higher than that to induce drying. For instance to make refined linseed oil dry, 0.5% of manganese soap is required, whereas to produce the surface effect of the present invention in the same oil, 5% of manganese soap is used. The barium and strontium soaps are similar in their action to calcium soaps.

The efficiency of the fatty acid radical in the soaps increases with its degree of unsaturation, that is to say in the succession: oleic acid, linolic acid and linoleic acid. It has been found as a practical rule that the soaps prepared from the fatty acid mixtures of perilla oil, linseed oil or soya bean oil and similar drying or semi-drying oils, are very suitable for the purposes of the present invention. Eleaostearic and similar acids, present in tung oil or oiticica oil, are inoperative.

The amount of soap necessary to produce the desired effect depends on a variety of conditions, and not only on the composition of the soap itself, but varies largely also with the nature of the surface coatings. The lower percentages may be used for pure linseed oil coatings, or coatings of similarly soft drying oils such as perilla, soya bean and sunflower oils. If resinous components and/or tung oil are present, the additions have to be increased considerably in proportion to the amounts of these materials present. No effect at all is obtained as soon as the percentage of soft drying oils in the composition drops below 50%.

The specific percentages or quantities necessary to produce the effect must be determined individually for each given instance, depending for example on the type of oil present, the ratio of resin to oil, the percentage of tung oil in the oily component, etc. But certain general characteristics will appear particularly from the examples given below, both with respect to the oils and the examples hereinafter set forth. A pure polymerized linseed oil, containing a small amount of cobalt drier, and a quantity of volatile thinner, necessary to reduce the viscosity to brushing consistency, will show the desired effect with additions of the following character: 2% calcium soap, 5% magnesium soap, 3% manganese soap of linseed oil fatty acids.

A copal varnish consisting of 100 parts of fused Congo, 200 parts of linseed oil polymerized together and thinned with 250 parts of turpentine, requires about 5% calcium oleate based on the oil present to produce the desired result. Another copal varnish longer in oil, based on one part of Sierra Leone copal and six parts of refined linseed oil requires only 1½% of calcium oleate, or the equivalent amounts of magnesium or manganese compounds in the oil.

As a further descriptive example, an estergum wood oil varnish may be cited. A varnish of this type composed of 100 parts of estergum, 100 parts of wood oil, 350 parts of perilla oil, and the necessary thinner and drier, requires an amount of about 3% calcium oleate in the oil part to produce the desired effect.

While in some cases the addition of soap may be in amounts smaller than that indicated above, the efficiency of the additions is not as great, and in general it may be said that more than 1% of the soap should be present based on the oil in the composition. For the best results, an amount is used which is only slightly lower than that which would produce tension folds. If the specified amounts are exceeded, the increase in tension of the surface skin leads to formation of longitudinal folds. For smooth coatings, therefore, such fold-producing proportions are to be avoided, but as noted textured effects can be obtained in this way if the latter are desired. In no case, however, are the dosages allowed to be increased to a point where they produce high viscosity, as customary for instance in processes incorporating metal oxides in oils to produce resinous, balsamic or gummy materials.

While the soaps of individual stated metals with individual acids of the oleic, linolic and linoleic type may be employed, various combinations may be used, etc., or the acids of the mixed soaps of various types may thus be employed, etc., where the metal component is diverse, or where there is a mixture of the unsaturated fatty acids of the stated type, as for example in the complex fatty acids obtained from the soft oils, or both expedients may be used.

Various methods may be employed for the incorporation of the desired soaps into the oleoresinous material. A simple way is to precipitate the mixed oleate from an aqueous alkali soap solution by the addition of an equivalent quantity of the metal salt, dissolved in water. After washing and drying, the oleate is either dissolved directly by heat in the surface coating material, or it may first be put into solution in a suitable volatile solvent, such as turpentine, xylol or aliphatic hydrocarbons, and a measured amount of such solution added as by cold mixing.

Another method includes reaction of the metal oxides, hydroxides or acetates with the oil at elevated temperatures of, for example, 260–280° C., whereby the glycerides decompose and metal soaps are formed. For practical purposes, usually only about half of the theoretical amount required for the total conversion of the oil into soap is used in this procedure, i. e., for instance about 5% of the metal oxides. The resulting mixture of soap and oil can be applied as such, or after thinning down with a volatile solvent, followed by filtration if necessary.

A third method for the preparation of suitable soaps makes use of the interchange esterification which takes place when the resinates of calcium, manganese, or magnesium, for example, are heated with oils at elevated temperature as, for example, 280° C. for a longer period of time. Under these conditions, the metal migrates from the abietic acid to the fatty acid, forming oleates or similar derivatives, which are particularly useful for the purposes of this invention. In the same reaction, the glycerol radical migrates from the fatty acid to the abietic acid. Particularly useful oleates or related compounds are obtained, if instead of the abietates, the metal compounds of copal acids are heated with oils. When, for instance, the calcium soap of Congo copal acids is caused to enter into chemical interchange with linseed oil, oleate compounds are formed, which after addition to copal linseed oil varnishes make them dry with a surface skin, possessing all the advantages hereinabove described, and particularly possessing the property of non-blooming when exposed to damp or polluted atmospheres.

The following examples illustrate various phases of the invention:

(1) A precipitated calcium linoleate is prepared by dissolving 100 parts of commercial linseed oil fatty acids in 200 parts of industrial alcohol, adding a solution of 18 parts of potassium hydroxide in 100 parts of water, applying a quantity sufficient to neutralize exactly the fatty acid and to form a neutral soap. To the soap solution is now added the solution of an equivalent amount of calcium salt, i. e., in this case, of 20 parts of calcium chloride in 100 parts of water. During the addition, the calcium soap is precipitated. It is washed repeatedly with hot water and dried at low temperature. To obtain the surface effect explained in the specification 2 parts of this product are dissolved in 100 parts of polymerized linseed oil by heating up to 260° C. The resulting oil differs largely from an ordinary stand oil. In the drying process it does not form the usual somewhat tacky film, which retains its stickiness for a long time and has a tendency to form a haze on its surface, but it dries to a film with a glazed porcelain-like surface, which on touch with the finger, even under pressure, gives the feeling of vitreous enamel.

(2) 5 parts of magnesium oxide are reacted with 100 parts of soya bean oil by heating up to 280° C., and the resulting reaction mixture is dissolved in 100 parts of xylol and filtered. At the same time an alkyd resin is prepared by esterifying with glycerine, in the usual manner, a mixture of 50 parts of rosin and 50 parts of a dibasic acid formed as the addition product of 2 parts of alpha terpinene and 1 part of maleic anhydride. The mixed ester obtained in this way is then polymerized in the customary way together with 125 parts of perilla oil and, during the final stage of cooking, 20 parts of the solution of magnesium soap, prepared as described beforehand, are slowly added and combined with the batch. The result is an alkyd resin which, on drying, develops a surface skin of a high degree of density which resembles the glazed surface of porcelain.

(3) 10 parts of manganese hydroxide are converted into a resinate by heating them with 100 parts of rosin to 270° C. When a sample is clear, 200 parts of linseed oil are added, and the batch is held at 280° for six hours. During this time a chemical interchange takes place, in the course of which the manganese migrates from the abietic acid to the fatty acid radical of the linseed oil, forming manganese oleate, which remains dissolved in the other components of the batch. When the resulting composition is incorporated into oleo-resinous varnishes, products are obtained which dry with oil-repellent surfaces. In the present example, the above batch is heat combined with a batch of 100 parts of a phenolic resin, 200 parts of linseed oil and 100 parts of wood oil, and finally thinned down with 300 parts of turpentine and 300 parts of mineral spirits.

The soft oil-containing compositions produced in accordance with the present invention may be in the final form of paints, varnishes and enamels, or intermediate products may be produced which can be manufactured and sold as such to paint and varnish manufacturers. For example, any of the soft oils carrying the stated soaps may serve as an entity to be manufactured and sold to be converted into the final type of product to be employed.

Having thus set forth my invention, I claim:

1. A surface coating composition adapted to give a porcelain-like, non-porous and tack-free surface containing at least 50% of a soft drying oil selected from the group consisting of linseed, perilla, soya bean and sunflower oils in the non-volatile portion thereof, and a soap selected from the alkali earth metals, magnesium and manganese soaps of oleic and linoleic acids, in an amount more than 1% based on the amount of the soft oil but insufficient to produce deep longitudinal folds in the dried coating.

2. A surface coating composition adapted to give a porcelain-like, non-porous and tack-free surface containing at least 50% of a soft drying oil selected from the group consisting of linseed, perilla, soya bean and sunflower oils in the non-volatile portion thereof, and a calcium soap of a fatty acid of an oil selected from the group consisting of linseed, perilla, soya bean and sunflower oils in an amount more than 1% based on the amount of the soft oil but insufficient to produce deep longitudinal folds in the dried coating.

3. A surface coating composition adapted to give a porcelain-like, non-porous and tack-free surface containing at least 50% of a soft drying oil selected from the group consisting of linseed, perilla, soya bean and sunflower oils in the non-volatile portion thereof, and a magnesium soap of a fatty acid of an oil selected from the group consisting of linseed, perilla, soya bean and sunflower oils in an amount more than 1% based on the amount of the soft oil but insufficient to produce deep longitudinal folds in the dried coating.

4. A surface coating composition adapted to give a porcelain-like, non-porous and tack-free surface containing at least 50% of a soft drying oil selected from the group consisting of linseed, perilla, soya bean and sunflower oils in the non-volatile portion thereof, and a manganese soap of a fatty acid of an oil selected from the group consisting of linseed, perilla, soya bean and sunflower oils, in an amount more than 1% based on the amount of the soft oil but insufficient to produce deep longitudinal folds in the dried coating.

5. A surface coating composition adapted to give a porcelain-like, non-porous and tack-free surface containing at least 50% of a soft oil selected from the group consisting of linseed, perilla, soya bean and sunflower oils in the non-volatile portion thereof, and a soap of fatty acids of a soft drying oil selected from the group consisting of linseed, perilla, soya bean, and sunflower oils with a metal selected from the group consisting of alkali earth metal, magnesium and manganese, in an amount more than 1% based on the amount of the soft oil but insufficient to produce deep longitudinal folds in the dried coating.

6. A composition for use in the production of surface coatings adapted to give a porcelain-like, non-porous and tack-free surface, said composition containing at least 50% of a soft oil selected from the group consisting of linseed, perilla, soya bean, and sunflower oils more than 1% based on the amount of the soft oil of a soap of fatty acids of a soft drying oil selected from the group consisting of linseed, perilla, soya bean and sunflower oils with a metal selected from the group consisting of the alkali earth metals, magnesium and manganese but insufficient in amount to produce deep longitudinal folds in the dried coating.

7. The method of producing surface coating compositions adapted to give a porcelain-like, non-porous and tack-free surface, which comprises incorporating a surface coating composition containing at least 50% of a soft drying oil selected from the group consisting of linseed, perilla, soya bean and sunflower oils in the non-volatile portion thereof with a soap selected from the group consisting of alkali earth metal, magnesium and manganese soaps of oleic and linoleic acids, in an amount more than 1% based on the amount of the soft oil but insufficient to produce deep longitudinal folds in the dried coating.

8. A method of producing coatings which dry with an oil-repellent, porcelain-like surface skin, which comprises incorporating a surface coating composition containing at least 50% of a soft drying oil selected from the group consisting of linseed, perilla, soya bean and sunflower oils in the non-volatile portion thereof with a calcium soap of a fatty acid of an oil selected from the group consisting of linseed, perilla, soya bean and sunflower oils in an amount more than 1% based on the amount of the soft oil but insufficient to produce deep longitudinal folds in the dried coating.

9. A method of producing coatings which dry with an oil-repellent, porcelain-like surface skin, which comprises incorporating a surface coating composition containing at least 50% of a soft drying oil selected from the group consisting of linseed, perilla, soya bean and sunflower oils in the non-volatile portion thereof with a magnesium soap of a fatty acid of an oil selected from the group consisting of linseed, perilla, soya bean and sunflower oils in an amount more than 1% based on the amount of the soft oil but insufficient to produce deep longitudinal folds in the dried coating.

10. A method of producing coatings adapted to give a porcelain-like, non-porous and tack-free surface which comprises incorporating a surface coating composition containing at least 50% of a soft drying oil selected from the group consisting of linseed, perilla, soya bean and sunflower oils in the non-volatile portion thereof with a manganese soap of a fatty acid of an oil selected from the group consisting of linseed, perilla, soya bean and sunflower oils, in an amount more than 1% based on the amount of the soft oil but insufficient to produce deep longitudinal folds in the dried coating.

11. The method of making surface coating compositions adapted to give a porcelain-like, non-porous and tack-free surface, which comprises heating a composition containing at least 50% of a soft drying oil selected from the group consisting of linseed, perilla, soya bean and sunflower oils at elevated temperatures with more than 1% based on the amount of the soft oil of a soap selected from the group consisting of alkali earth metal, magnesium and manganese soaps of oleic and linoleic acids but insufficient in amount to produce deep longitudinal folds in the dried coating until the soap is incorporated into the oil.

12. The method of making surface coating compositions adapted to give a porcelain-like, non-porous and tack-free surface which comprises heating a composition containing at least 50% of a soft drying oil selected from the group consisting of linseed, perilla, soya bean and sunflower oils at elevated temperatures with a resinate of a metal selected from the group consisting of alkali earth metal, magnesium and manganese at elevated temperatures until more than 1% based on the amount of the soft oil but insufficient in amount to produce deep longitudinal folds in the dried coating of a soap of said metal with soft drying oil acids is formed.

13. The method of producing surface coating compositions adapted to give a porcelain-like, non-porous and tack-free surface which comprises heating a composition containing at least 50% of a soft drying oil selected from the group consisting of linseed, perilla, soya bean and sunflower oils at elevated temperatures with a component selected from the group consisting of alkali earth metal, magnesium and manganese oxides, hydroxides, acetates and resinates to form more than 1% based on the amount of the soft oil of a soap in said reaction mixture but insufficient in amount to produce deep longitudinal folds in the dried coating.

14. The method of producing surface coating compositions adapted to give a porcelain-like non-porous and tack-free surface which comprises forming a soap selected from the group consisting of alkali earth metal, magnesium and manganese soaps of oleic and linoleic acids, and incorporating said soap with a composition containing at least 50% of a soft drying oil selected from the group consisting of linseed, perilla, soya bean and sunflower oils in an amount more than 1% based on the amount of the soft oil but insufficient to produce deep longitudinal folds in the dried coating.

15. The method of producing surface coating composition adapted to give a porcelain-like, non-porous and tack-free surface which comprises forming a soap selected from the group consisting of alkali earth metal, magnesium and manganese soaps of oleic and linoleic acids by precipitating an alkali soap of said acids with a compound of calcium, magnesium and manganese, and incorporating said soap with a composition containing at last 50% of a soft drying oil selected from the group consisting of linseed, perilla, soya bean and sunflower oils in an amount more than 1% based on the amount of the soft oil but insufficient to produce deep longitudinal folds in the dried coating.

16. A component for use in surface coatings adapted to give a porcelain-like, non-porous and tack-free surface consisting of a soft drying oil selected from the group consisting of linseed, perilla, soya bean and sunflower oils, and at least 1% based on the amount of the soft oil of a soap selected from the group consisting of alkali earth metal, magnesium and manganese soaps of oleic and linoleic acids but insufficient in amount to produce deep longitudinal folds in the dried coating.

17. A surface coating composition adapted to give a porcelain-like, non-porous and tack-free surface containing a soft drying oil selected from the group consisting of linseed, perilla, soya bean and sunflower oils, a component selected from the group consisting of resins, tung oil and oiticica oil, the soft drying oil being at least 50% of the oils and resins present in the composition, and a soap selected from the group consisting of alkali earth metal, magnesium and manganese soaps of oleic and linoleic acids in an amount more than 1% based on the amount of the soft oil but insufficient to produce deep longitudinal folds in the dried coating.

WILLIAM KRUMBHAAR.